J. GROUAN.
CHEESE CUTTER.
APPLICATION FILED JAN. 28, 1908.

906,220.

Patented Dec. 8, 1908.
3 SHEETS—SHEET 1.

Fig. I

WITNESSES:
F. E. Arthur
John C. Gibson.

INVENTOR
Jac Grouan.
BY
N. E. Dunlap
ATTORNEY

J. GROUAN.
CHEESE CUTTER.
APPLICATION FILED JAN. 28, 1908.

906,220.

Patented Dec. 8, 1908.

3 SHEETS—SHEET 2.

WITNESSES:
F. E. Arthur
John E. Gibson.

INVENTOR
Jac Grouan
By N. E. Dunlap
ATTORNEY

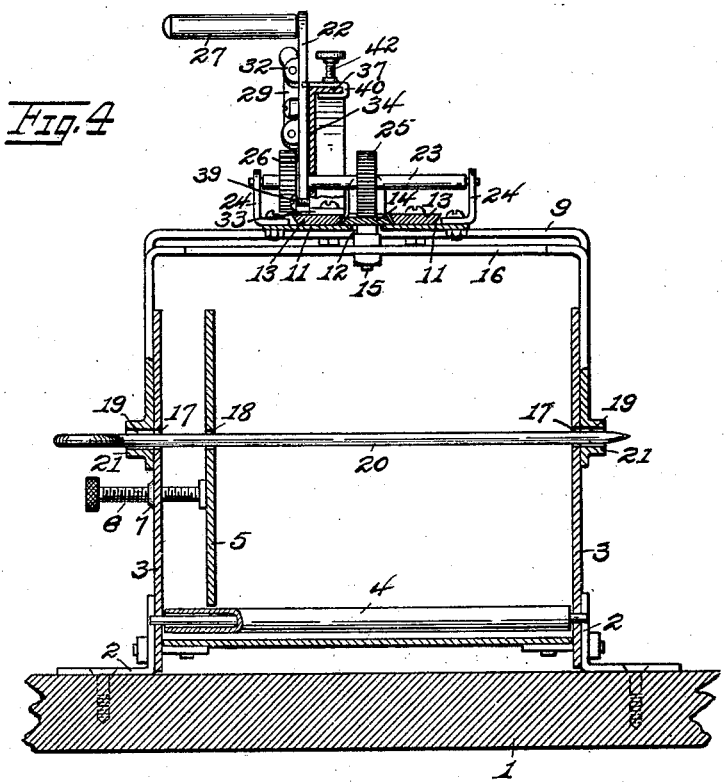

UNITED STATES PATENT OFFICE.

JAC GROUAN, OF WHEELING, WEST VIRGINIA.

CHEESE-CUTTER.

No. 906,220.  Specification of Letters Patent.  Patented Dec. 8, 1908.

Application filed January 28, 1908. Serial No. 412,979.

*To all whom it may concern:*

Be it known that I, JAC GROUAN, a subject of the Sultan of Syria, and resident of Wheeling, county of Ohio, and State of West Virginia, have invented certain new and useful Improvements in Cheese-Cutters, of which the following is a specification.

My invention relates to new and useful improvements in cheese cutters, and more particularly to a cutter for Schweitzer and other cheese which is rectangular in cross section.

The primary object of the invention is to provide, in connection with an appropriate form of cutting knife, a simple device for holding the cheese.

A further object is to provide means whereby the cheese may be carried or thrust forward in relation to the knife into position for having a slice or fractional portion cut therefrom. And a still further object is to provide means whereby a cheese of any ordinary width may be rigidly held, and computing means whereby the length of the thrust may be determined.

With these and other objects in view, all of which will hereinafter be made apparent, the invention finally consists in the particular construction, arrangement and combination of parts which will hereinafter be fully described, reference being herein had to the accompanying drawings, forming a part of this specification, in which—

Figure 1:
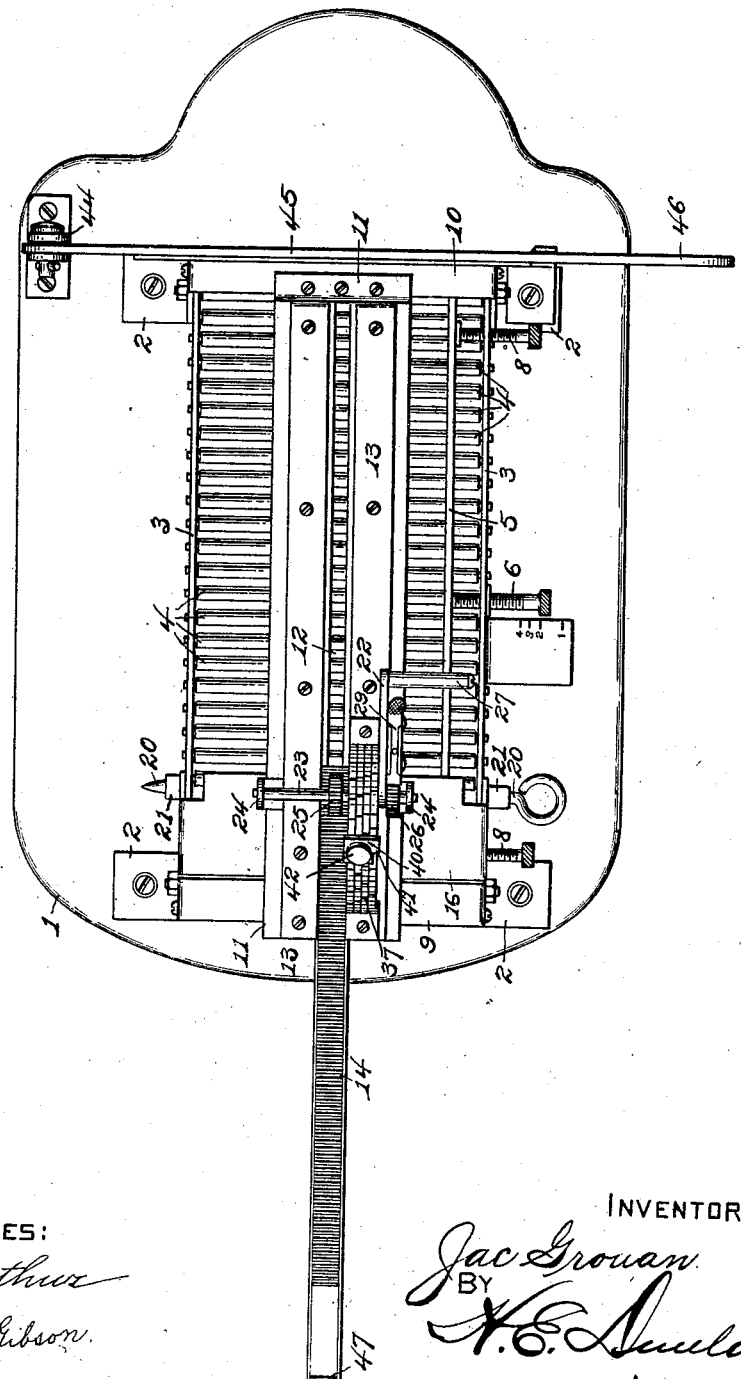
Figure 2:
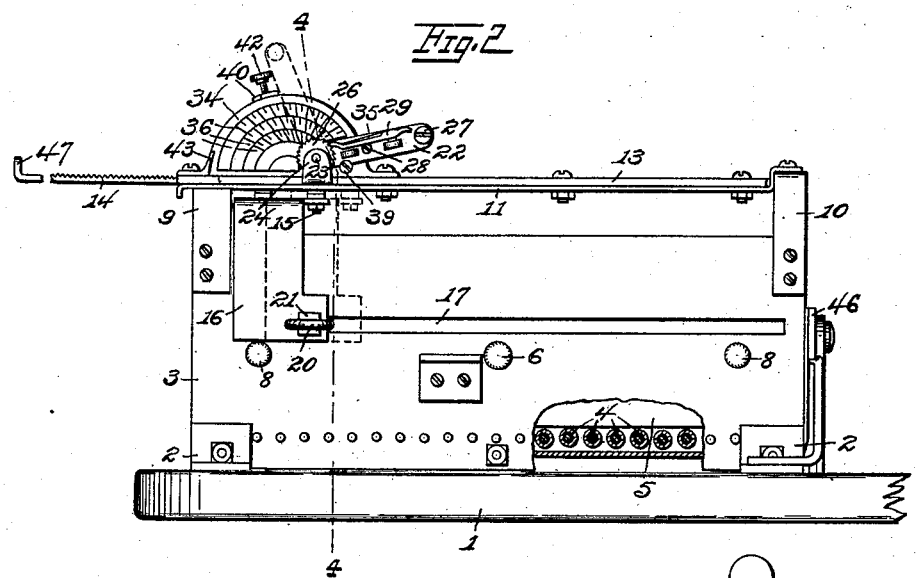
Figure 3:
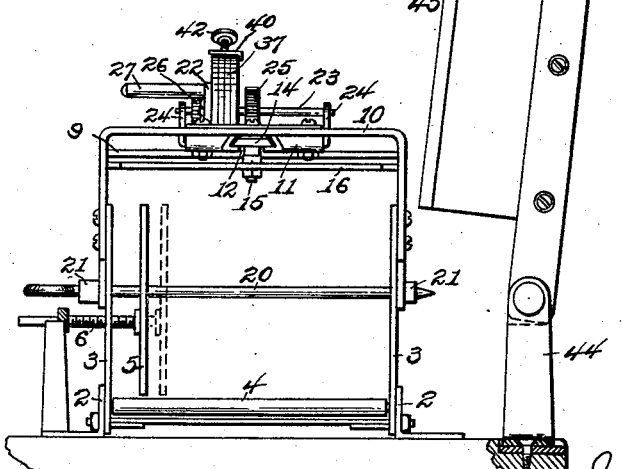

Figure 1 is a top plan view of the invention; Fig. 2 is a side elevation of the same; Fig. 3 is a front-end elevation of the same; Fig. 4 is an enlarged cross section on the line 4—4, Fig. 2, showing the operating lever in the position indicated in dotted lines in said Fig. 2; Fig. 5 is an enlarged side elevation of the semi-circular plate bearing the computing scale, and also of the operating lever and ratchet mechanism; Fig. 6 is a top plan view of the same; and—Fig. 7 is a perspective view of the adjustable clip.

Referring to said drawings, in which like designating characters distinguish like parts throughout the several views—1 indicates a base plate upon which a frame is mounted or attached by means of securing lugs 2, said frame consisting of two vertical parallel side-plates 3. Rotatably mounted in the lower parts of these side-plates is a plurality of horizontal transverse rollers 4 adapted for having the cheese mounted thereon. As a means of gripping cheeses of varying widths, an adjustable plate 5 is provided adjacent to one of the side-plates 3 for coöperating with the opposite side-plate. Said plate 5 is supported upon the swivel-end (not shown) of a centrally-located adjusting-screw 6, which is projected through the adjacent side-plate, the latter having a boss 7 which is provided with internal screw-threads (not shown). Adjusting-screws 8, also projected through said side-plate 3, are adapted to be manipulated to impinge upon the opposite ends of the adjustable plate 5 for holding the latter in parallel alinement with said side-plate.

Rigidly mounted upon the side-plates 3 at the rear and front ends, respectively, are transverse overlying bowed supports 9 and 10 upon which are rigidly mounted the opposite ends of a longitudinal metal plate 11 which has a longitudinal slot 12 therein, and rigidly mounted upon said plate 11 at each side of said slot is a bar 13 whose inner edge is downwardly and rearwardly beveled forming a track or runway in which travels a longitudinal rack-bar 14 whose opposite edges are beveled to correspond with the edges of said bars 13. Suspended from said rack-bar 14 in any appropriate manner, as by bolts 15, and movable with said rack-bar, is a bowed plate 16 whose ends embrace the side-plates 3, as shown; and in said ends and registering with longitudinal horizontal slots 17 provided opposite each other in said side-plates and with a slot 18 in said adjustable plate 5 are eyes 19 through which a removable pin 20 is transversely directed, said pin being adapted to penetrate the cheese for holding the latter in fixed relation to said rack-bar. Outwardly extending bosses 21 are provided about said eyes for facilitating the registration of the point of the pin with the opposite eye when it is projected through the cheese.

As is obvious, when the rack-bar 14 is thrust forward, the cheese will be carried forward therewith. As a means of thrusting the rack-bar forward, an operating lever and interposed gear-mechanism are provided, said gear-mechanism comprising a transverse shaft 23 having its ends journaled in upright supports 24 mounted upon the opposite edges of the plate 11 adjacent to its rear end, a gear wheel 25 fixed upon said shaft 23 and in meshing engagement with the upper toothed face of said rack-bar, and a ratchet-wheel 26 fixed upon said shaft at a point adjacent to one of its ends. Loosely mounted on said shaft 23 adjacent to the inner face of the ratchet 26 is the crank-like operating lever 22, which is preferably provided with an outwardly-directed handle 27, as shown. Pivotally mounted at a point 28 on said lever is a pawl 29 which is normally held with its point 30 in engagement with the forwardly-directed teeth of said ratchet by means of a small coil spring 31 seated upon an outwardly-directed lip or lug 32 carried by said lever and having its upper end in supporting engagement with the rear end of said pawl.

Mounted upon the top of a bar 13 adjacent to the inner face of the operating lever 22 is the base 33 of a semi-circular plate 34 through which said shaft 23 is projected. Said plate 34 bears upon its face a computing scale which consists of a series of sets of numbered graduations for indicating the length of thrust of the operating lever necessary for moving the cheese forward a certain distance. The numbers applied indicate price, and, in operating, the lever is turned upon its axis to bring its upper edge 35 into alinement with the graduation whose number indicates a given price. For instance, the graduations of the set being properly arranged on the plate, when a customer calls for a certain number of cents' worth of cheese, the lever is moved into alinement with the graduation whose number corresponds with the amount called for. This action, through the intermediate mechanism, thrusts the cheese forward on the rollers 4 the distance necessary for producing a piece of cheese of the size required for corresponding with said price.

It will be noted that a plurality of sets 36 of said graduations upon said plate are illustrated in the drawings, and that the lengths of the graduations differ in each. The purpose of this arrangement is to provide for variations in the price, or it is adapted to provide for the measuring off of cheese of varying sizes. To illustrate, there being three different sets of graduations on the plate, and the lengths of these graduations being different in each, three different lengths of cheese may be cut off for an indicated price, as, for instance, when the price of cheese is such that the lowermost set is correctly graduated and numbered for measuring the cheese, that set is employed; but, when the price advances to a point where the next set of graduations indicates correctly, it is employed; and so on. Or, when a large size cheese is held by the device, one of the lower sets of graduations is employed in computing, whereas, when one of the smaller sizes is held, a set in which the graduations are correspondingly longer is employed.

The plate 34 has an overlying curved flange or top-plate 37 which stands at right angles thereto, as shown, and said flange or plate 37 preferably bears a plurality of sets 38 of graduations thereon corresponding to the sets 36 on the plate 34, there being in the present case four sets 38 numbered 1, 2, 3 and 4, as is clearly shown in Fig. 6.

An adjustable clip 40 is mounted upon said flange or plate 37, which clip is adapted to be adjusted to any position to limit the forward thrust of the lever 22. Said clip consists of a flange-embracing member having an extended end 41 which projects into the path of movement of the lever and against which the latter is adapted to strike. A set-screw 42 projected through said clip into impinging relation with said flange is adapted to secure the former in adjusted position.

An outwardly extending stop 39 is mounted in the plate 34 at a suitable point for limiting the rearward movement of the lever 22, while a lug 43 integral with said plate 34 is adapted to limit the forward movement of said lever.

Suitably mounted upon the base 1 at a suitable point is an upright support 44 to which is pivotally attached one end of a transverse cheese-cutting knife 45 which is adapted to operate transversely of the line of travel of the cheese and close against the front ends of the side-plates 3. An operating handle 46 is carried by the front end of said knife, as shown.

A lug or finger-piece 47 is provided on the rear end of the rack-bar whereby the latter may be grasped for retracting. Retraction of said rack-bar is effected by depressing the rear end of the pawl 29 to disengage its point 30 from the ratchet 26, and manually drawing said rack-bar rearwardly.

Having thus described my invention, what I claim as new, and desire to secure by Letters Patent, is—

1. In a cheese cutter, a frame, rollers mounted in said frame for carrying a cheese, supports carried by said frame at its opposite ends, a track sustained by said supports, a rack-bar mounted to travel on said track, means carried by said rack-bar for maintaining said rack-bar and the cheese in fixed relation, means for thrusting said rack-bar forward, and a knife arranged to operate transversely of the line of travel of the cheese.

2. In a device of the character described, a frame, rollers mounted in said frame for carrying a cheese thereon, supports carried by said frame at its opposite ends, a track sustained by said supports, a rack-bar mounted to travel on said track, means carried by said rack-bar for maintaining said rack-bar and the cheese in fixed relation, and mechanism whereby said rack-bar may be thrust forward along said track.

3. In a cheese cutter, a frame, rollers mounted in said frame for carrying a cheese thereon, supports carried by said frame at its opposite ends, a track sustained by said supports, a rack-bar mounted to travel on said track, means carried by said rack-bar for maintaining said rack-bar and the cheese in fixed relation, mechanism whereby said rack-bar may be thrust forward any desired distance along said track, carrying the cheese therewith, and a knife arranged to operate transversely of the line of travel of the cheese.

4. In a cheese cutter, a frame, rollers mounted in said frame for carrying a cheese thereon, supports carried by said frame at its opposite ends, a track sustained by said supports, a rack-bar mounted to travel on said track, means carried by said rack-bar for maintaining said rack-bar and the cheese in fixed relation, mechanism whereby said rack-bar may be thrust forward along said track, computing means whereby the length of thrust desired may be determined, and a knife arranged to operate transversely of the line of travel of the cheese.

5. In a cheese cutter, a frame, rollers mounted in said frame for carrying a cheese thereon, supports carried by said frame at its opposite ends, a track sustained by said supports, a rack-bar mounted to travel on said track, means carried by said rack-bar for maintaining said rack-bar and the cheese in fixed relation, mechanism whereby said rack-bar may be thrust forward along said track, computing means whereby the length of thrust desired may be determined, means for limiting the length of said thrust, and a knife arranged to operate transversely of the line of travel of the cheese.

6. In a cheese cutter, a frame, rollers mounted in said frame for carrying a cheese thereon, supports carried by said frame at its opposite ends, a track sustained by said supports, a rack-bar mounted to travel on said track, means carried by said rack-bar for maintaining said rack-bar and the cheese in fixed relation, gear mechanism whereby said rack-bar may be thrust forward, computing means for determining the length of thrust desired, a clip adapted for adjustment to limit the length of said thrust, and a knife arranged to operate transversely of the line of travel of the cheese.

7. In a cheese cutter, a frame, rollers mounted in said frame for carrying a cheese thereon, supports carried by said frame at its opposite ends, a track sustained by said supports, a rack-bar mounted to travel on said track, a transverse plate, having downwardly extending ends, suspended from said rack-bar, a pin for projecting through a cheese carried by said rollers, said pin being removably mounted in said downwardly extending ends and being adapted to hold the cheese in fixed relation to said rack-bar, and a knife arranged to operate transversely of the line of travel of the cheese.

8. In a cheese cutter, side-plates, transverse rollers mounted in said side-plates, transverse overlying supports borne by the ends of said plates, a longitudinal track sustained by said supports, a rack-bar mounted to travel along said track, means suspended from said rack-bar for maintaining a cheese carried by said rollers in fixed relation to said rack-bar, gear mechanism whereby said rack-bar may be thrust forward along said track for carrying the cheese forward, and a knife arranged to operate transversely of the line of travel of the cheese.

9. In a cheese cutter, side-plates, transverse rollers mounted in said side-plates, transverse overlying supports borne by the ends of said plates, a longitudinal track sustained by said supports, a rack-bar mounted to travel along said track, means suspended from said rack-bar for maintaining a cheese carried by said rollers in fixed relation to said rack-bar, gear mechanism whereby said rack-bar may be thrust forward along said track for carrying the cheese forward, said mechanism comprising supports, a shaft mounted in said supports, a gear-wheel carried by said shaft in operative engagement with said rack-bar, an operating lever carried by said shaft, and a knife arranged to operate transversely of the line of travel of the cheese.

10. In a cheese cutter, side-plates, transverse rollers mounted in said side-plates, transverse overlying supports borne by the ends of said plates, a longitudinal track sustained by said supports, a rack-bar mounted to travel along said track, means suspended from said rack-bar for maintaining a cheese carried by said rollers in fixed relation to said rack-bar, gear mechanism whereby said rack-bar may be thrust forward along said track for carrying the cheese forward, said mechanism comprising supports, a shaft mounted in said supports, a gear-wheel carried by said shaft in operative engagement with said rack-bar, an operating lever carried by said shaft, a ratchet on said shaft adjacent to said lever, a spring-controlled pawl mounted in fixed relation to said lever and normally having its point in engagement with said ratchet, and a knife arranged to operate transversely of the line of travel of the cheese.

11. In a cheese cutter, side-plates, transverse rollers mounted in said side-plates, transverse overlying supports borne by the ends of said plates, a longitudinal track sustained by said supports, a rack-bar mounted to travel along said track, means suspended from said rack-bar for maintaining a cheese carried by said rollers in fixed relation to said rack-bar, gear mechanism whereby said rack-bar may be thrust forward along said track for carrying the cheese forward, said mechanism comprising supports, a shaft mounted in said supports, a gear-wheel carried by said shaft in operative engagement with said rack-bar, an operating lever carried by said shaft, a ratchet on said shaft adjacent to said lever, a spring-controlled pawl mounted in fixed relation to said lever and normally having its point in engagement with said ratchet, a plate mounted parallel to the line of movement of said lever and bearing graduations thereon, and a knife arranged to operate transversely of the line of travel of the cheese.

12. In a cheese cutter, side-plates, transverse rollers mounted in said side-plates, a longitudinal track sustained by said plates, a rack-bar mounted to travel along said track, means connected with said rack-bar for maintaining a cheese carried by said rollers in fixed relation to said rack-bar, gear mechanism by means of which said rack-bar may be thrust forward along said track for advancing the cheese, said mechanism comprising supports, a shaft journaled in said supports, a gear-wheel carried by said shaft in operative engagement with said rack-bar, an operating lever carried by said shaft, a ratchet mechanism in connection with said lever, a plate mounted parallel to the line of movement of said lever, and bearing a series of sets of graduations thereon, and a knife arranged to operate transversely of the line of travel of the cheese.

13. In a cheese cutter, side-plates, transverse rollers mounted in said side-plates, a longitudinal track supported by said plates, a rack-bar mounted to travel along said track, means connected with said rack-bar for maintaining a cheese carried by said rollers in fixed relation with said rack-bar, gear mechanism by means of which said rack-bar may be thrust forward along said track for advancing the cheese, said mechanism comprising supports, a shaft journaled in said supports, a gear wheel carried by said shaft in operative engagement with said rack-bar, an operating lever carried by said shaft, a ratchet mechanism associated with said lever, a plate mounted parallel to the line of movement of said lever, and bearing graduations thereon, an adjustable clip for limiting the forward movement of said lever, and a knife arranged to operate transversely of the line of travel of the cheese.

14. In a cheese cutter, side-plates, transverse rollers mounted in said side-plates, a longitudinal track supported by said plates, a rack-bar mounted to travel along said track, a traveling carriage suspended from said rack-bar and adapted for maintaining the cheese mounted on said rollers in fixed relation thereto, and a knife arranged to operate transversely of the line of travel of the cheese.

In testimony whereof I affix my signature in presence of two subscribing witnesses.

JAC GROUAN.

Witnesses:
H. E. DUNLAP,
JNO. B. WILSON.